United States Patent
Cabasso et al.

[11] Patent Number: 6,103,414
[45] Date of Patent: Aug. 15, 2000

[54] BLEND MEMBRANES BASED ON SULFONATED POLY(PHENYLENE OXIDE) FOR POLYMER ELECTROCHEMICAL CELLS

[75] Inventors: Israel Cabasso; Youxin Yuan; Cortney Mittelsteadt, all of Syracuse, N.Y.

[73] Assignee: The Research Foundation of State University of the New York, Albany, N.Y.

[21] Appl. No.: 09/133,228

[22] Filed: Aug. 13, 1998

Related U.S. Application Data

[63] Continuation-in-part of application No. 08/725,747, Oct. 4, 1996, Pat. No. 5,989,742, which is a continuation-in-part of application No. 08/580,381, Dec. 28, 1995, abandoned.

[51] Int. Cl.[7] .................................................. H01M 8/10
[52] U.S. Cl. .......................... 429/33; 429/309; 429/316
[58] Field of Search .................................. 429/309, 316, 429/33; 361/502

[56] References Cited

U.S. PATENT DOCUMENTS

| | | |
|---|---|---|
| 3,226,361 | 12/1965 | Borman . |
| 3,282,875 | 11/1966 | Connolly et al. . |
| 3,528,858 | 9/1970 | Hodgdon . |
| 4,175,153 | 11/1979 | Dobo et al. . |
| 4,268,278 | 5/1981 | Dobo et al. . |
| 4,329,157 | 5/1982 | Dobo et al. . |
| 4,330,654 | 5/1982 | Ezzell et al. . |
| 4,348,458 | 9/1982 | Otstot . |
| 4,654,055 | 3/1987 | Malon et al. . |
| 4,761,233 | 8/1988 | Linder et al. . |
| 4,866,099 | 9/1989 | Hendy . |
| 5,151,193 | 9/1992 | Grobe et al. . |
| 5,348,569 | 9/1994 | Bikson et al. . |
| 5,364,454 | 11/1994 | Bikson et al. . |
| 5,422,411 | 6/1995 | Wei et al. . |

FOREIGN PATENT DOCUMENTS

| | | |
|---|---|---|
| 574891 | 12/1993 | European Pat. Off. . |
| 31 43 804 | 12/1982 | Germany . |
| WO 97/24777 | 7/1997 | WIPO . |
| WO 98/22989 | 5/1998 | WIPO . |

OTHER PUBLICATIONS

Patent Abstracts of Japan, vol. 013, No. 145, Apr. 10, 1989.
Patent Abstracts of Japan, vol. 002, No. 059, Apr. 27, 1978.
Chemical Abstracts, vol. 104, No. 12, Mar. 24, 1986.
*LCST Behavior in Polymer Blends* by R.E. Bernstein et al., Macromolecules, vol. 10, No. 3 (Jun., 1977), pp. 681–686.
*Selective Gas Transport in Miscible PPO–PS Blends* by Y. Maeda et al., Polymers, vol. 26, (Dec. 1985), pp. 2055–2063.

*Primary Examiner*—John S. Maples

[57] ABSTRACT

Solid polymer membranes comprised of a high charge density sulfonated poly (phenylene oxide) blended with poly(vinylidene fluoride) in varied ratios have improved membrane characteristics. These membranes are inexpensive and possess very high ionic conductivity, and thus are suitable for solid polymer electrolytes in electrochemical applications, especially for the polymer electrolyte membrane (PEM) fuel cell, the electrolyte double-layer capacitor, and the rechargeable zinc-halide cell. These membranes enhance the performance of these devices.

9 Claims, 7 Drawing Sheets

BLEND MEMBRANES BASED ON SULFONATED POLY(PHENYLENE OXIDE) FOR POLYMER ELECTROCHEMICAL CELLS

This application is a continuation-in-part of Ser. No. 08/725,747, filed Oct. 4, 1996, now U.S. Pat. No. 5,989,742, which is a continuation-in-part of Ser. No. 08/580,381, filed Dec. 28, 1995, now abandoned.

FIELD OF THE INVENTION

This invention relates to homogeneous blends of sulfonated poly(phenylene oxide) and poly(vinylidene fluoride), their use as ion exchange membranes in electrochemical applications, such as solid polymer electrolyte fuel cells, electrolyte double-layer capacitors, and rechargeable zinc-halide cells. Further, this invention also relates to an improved solid polymer electrolyte fuel cell containing the novel blend membranes. This invention also relates to an improved electrolyte double-layer capacitor containing the novel blend membranes. Additionally, the invention relates to a rechargeable zinc-halide cell containing the novel blend membranes.

BACKGROUND OF THE INVENTION

Fuel cells are electrochemical devices in which part of the energy of a chemical reaction is converted directly into direct current electrical energy. The direct conversion of energy into direct current electrical energy eliminates the necessity of converting energy into heat thereby avoiding the Carnot-cycle efficiency limitation of conventional methods of generating electricity. Thus, without the limitation of the Carnot-cycle, fuel cell technology offers the potential for fuel efficiencies two to three times higher than those of traditional power generator devices, e.g., internal combustion engines. Other advantages of fuel cells are quietness, cleanliness (lack of air pollution) and the reduction or the complete elimination of moving parts.

Typically, fuel cells contain two porous electrical terminals called electrodes with an electrolyte disposed therebetween. In the operation of a typical fuel cell, an oxidant is continuously introduced at the oxidant electrode (cathode) where it contacts the electrode and forms ions thereby imparting positive charges to the cathode. Simultaneously, a reductant is continuously introduced at the fuel electrode (anode) where it forms ions and leaves the anode negatively charged. The ions formed at the respective electrodes migrate in the electrolyte and unite while the electrical charges imparted to the electrode are utilized as electrical energy by connecting an external circuit across the electrodes. Fuel cell reactants are classified as oxidants and reductants based on their electron acceptor or electron donor characteristics. Oxidants include pure oxygen, oxygen-containing gases (e.g., air) and halogens (e.g., chlorine). Reductants include hydrogen, carbon monoxide, natural gas, methane, ethane, formaldehyde and methanol.

The electrolyte of the fuel cell serves as the electrochemical connection between the electrodes providing a path for ionic current in the circuit while the electrodes, made of carbon or metal, provide an electrical pathway. Further, the electrolyte prevents transfer of the reactants away from the respective electrodes where the formation of explosive mixtures can occur. The electrolyte utilized must not react directly to any appreciable extent with the reactants or reaction products formed during the operation of the fuel cell. Further, the electrolyte must permit the migration of ions formed during operation of the fuel cell. Examples of electrolytes that have been used are aqueous solutions of strong bases, such as alkali metal hydroxides, aqueous solutions of acids, such as sulfuric acid and hydrochloric acid, aqueous salt electrolytes, such as sea water, fused salt electrolytes and ion-exchange polymer membranes.

One type of fuel cell is a polymer electrolyte (PEM) fuel cell which is based on a proton exchange polymer membrane. The PEM fuel cell contains a solid polymer membrane, which is an "ion-exchange membrane" that acts as an electrolyte. The ion-exchange membrane is sandwiched between two "gas diffusion" electrodes, an anode and a cathode, each commonly containing a metal catalyst supported by an electrically conductive material. The gas diffusion electrodes are exposed to the respective reactant gases, the reductant gas and the oxidant gas. An electrochemical reaction occurs at each of the two junctions (three phase boundaries) where one of the electrodes, electrolyte polymer membrane and reactant gas interface.

For example, when oxygen is the oxidant gas and hydrogen is the reductant gas, the anode is supplied with hydrogen and the cathode with oxygen. The overall chemical reaction in this process is: $2H_2+O_2 \rightarrow 2H_2O$. The electrochemical reactions that occur at the metal catalyst sites of the electrodes are as follows:

anode reaction: $2H_2 \rightarrow 4H^+ + 4e^-$ cathode reaction: $O+4H^+ +4e^- \rightarrow 2H_2O$ During fuel cell operation, hydrogen permeates through the anode and interacts with the metal catalyst, producing electrons and protons. The electrons are conducted via an electronic route through the electrically conductive material and the external circuit to the cathode, while the protons are simultaneously transferred via an ionic route through the polymer electrolyte membrane to the cathode. Concurrently, oxygen permeates to the catalyst sites of the cathode, where the oxygen gains electrons and reacts with the protons to yield water. Consequently, the products of the PEM fuel cell reactions are water and electricity. In the PEM fuel cell, current is conducted simultaneously through ionic and electronic routes. Efficiency of the PEM fuel cell is largely dependent on the ability to minimize both ionic and electronic resistivity to current.

Ion-exchange membranes play a vital role in PEM fuel cells. Improved membranes have substantially increased power density. In PEM fuel cells, the ion-exchange membrane has two functions: (1) it acts as the electrolyte that provides ionic communication between the anode and cathode; and (2) it serves as a separator for the two reactant gases (e.g., $O_2$ and $H_2$).

Optimized proton and water transports of the membrane and proper water management are crucial for efficient fuel cell application. Dehydration of the membrane reduces proton conductivity, and excess water can lead to swelling of the membranes and flooding of the electrodes. Both conditions result in poor cell performance. In the fuel cell, the ion-exchange membrane, while serving as a good proton transfer membrane, also must have low permeability for the reactant gases to avoid crossover phenomena that reduce performance of the fuel cell. This is especially important in fuel cell applications in which the reactant gases are under pressure and the fuel cell is operated at elevated temperatures. Therefore, a good ion-exchange membrane for a PEM fuel cell has to meet the following criteria: (1) chemical and electrochemical stability in the fuel cell operating environment; (2) mechanical strength and stability under cell operating conditions; (3) high proton conductivity, low permeability to reactant gas, and high water transport; and (4) low production costs.

An electrolyte double-layer capacitor comprises a separator layer positioned between polarizable electrodes. Almost every double-layer capacitor uses either filter paper or thin prose polypropylene film. Polypropylene (PP) is very hydrophobic with high electric resistance, which results in an increased internal resistance of the double-layer capacitor. Therefore, a good ion-exchange membrane for an electrolyte double-layer capacitor has to meet the following criteria: (1) chemical and electrochemical stability in the operating environment; (2) mechanical strength and stability under operating conditions; (3) high ion conductivity; (4) low electric resistance, and (5) low production costs.

Zinc-halogen rechargeable cells have a high theoretical energy density. In those cells, an aqueous zinc halide salt electrolyzes to zinc metal, which deposits on an anode, while molecular halides accumulate at a cathode. As the cell discharges, zinc and molecular halide react back into the salt form. However, diffusion of the halides from the cathode to the anode causes internal self-discharge of the cell when molecular halides react with zinc deposited on the anode. Therefore, a separator must be placed between the two electrodes. However, these membranes have a high internal resistance, and are very expensive. Therefore, a good ion-exchange membrane for a zinc-halogen rechargeable cell has to meet the following criteria: (1) chemical and electrochemical stability in the operating environment; (2) mechanical strength and stability under cell operating conditions; (3) electric resistance that can be adjusted, and (4) low production costs.

A variety of membranes have been developed over the years for electrochemical applications, such as solid polymer electrolytes in fuel cells, electrolyte double-layer capacitors, and rechargeable zinc-halide cells. Sulfonic acids of polydivinylbenzene-styrene based copolymers have been used as electrolytes in fuel cells. Perfluorinated sulfonic acid membranes developed by DuPont and Dow Chemical Company also have been used as electrolytes in fuel cells. DuPont's Nafion® membrane is described in U.S. Pat. Nos. 3,282,875 and 4,330,654. Nafion®-type membranes have high stability and good performance in fuel cell operations. However, they are relatively expensive to produce.

Alternatively, a series of low cost, ion-exchange membranes for PEM fuel cells have been investigated. U.S. Pat. No. 5,422,411 describes trifluorostyrene copolymers that have shown promising performance data as membranes in PEM fuel cells. Sulfonated poly(aryl ether ketones) developed by Hoechst AG are described in European Patent No. 574,891, A2. These polymers can be crosslinked by primary and secondary amines. When used as membranes and tested in PEM fuel cells, these polymers exhibited only modest cell performance. A series of low cost, sulfonated polyaromatic based systems, such as those described in U.S. Pat. Nos. 3,528,858 and 3,226,361, also have been investigated as membrane materials for PEM fuel cells. These materials suffer from poor chemical resistance and mechanical properties that limit their use in PEM fuel cell applications.

Polymer blending is a simple, more feasible technology than methods that compound different polymer segments via copolymerization or the formation of inter-penetrating materials. Homogeneous polymer blends consist of two polymers that are miscible at the molecular level and combine the properties of the components to yield a distinct new material. However, very rarely does the blending of polymers result in a homogenous polymer blend because in general, polymers do not mix homogeneously, even when they are prepared using the same solvent.

In most cases, Gibbs' free energy of mixing [$\Delta G = \Delta H - T\Delta S$] of polymers is a positive value because the entropy of mixing ($\Delta S$) of high molecular macromolecules approaches zero when the molecular weight of the polymers is greater than 10,000. Unless the enthalpy of mixing ($\Delta H$) is negative or at least equal to zero, polymers are not miscible and attempts to blend the polymers results in phase separation in the "blend" resulting in poor mechanical strength, i.e., a non-homogenous "blend" that retains the distinct phases of the pure polymers and in most cases, poor interaction between the phases occurs. Thus, the non-homogenous "blend" falls apart or has a much weaker structure than the original polymers.

Miscibility of polymers occurs in their amorphous regions. If one polymer in a two polymer blend is a semi-crystalline material, the crystal structure of the polymer retains its purity in the blend. However, its melting point usually decreases when the two polymers in the blend are miscible. Therefore, if two polymers are miscible, and one of the polymers is semi-crystalline, a semi-crystalline polymer blend is formed in which the amorphous structure is miscible. The different amorphous phases of the two polymers do not separate, but the crystalline component spreads within the amorphous structure and serves as "crosslink" junctures.

The crosslinking term when applied to crystalline junctures does not refer to chemical crosslinking as in chemical or radiation treatment. Rather in this context, it refers to what occurs because the crystals are composed of macromolecules that extend into the amorphous structure and, thus interact and blend with the polymer chains of the non-crystalline polymers. Therefore, the crystalline structure is tied up to the amorphous structure in polymer blending by polymer molecules that partially take part in the building of the crystal and are partially amorphous. These polymer molecules take part in the amorphous form and interact with other miscible polymers. For example, it is expected that a polymer blend, semi-crystalline film will exhibit a much higher tensile strength than the theoretical arrhythmic weight average of the pure polymer component. Also, it is expected that miscible polymers in a blend will display homogeneity with regard to some desired properties such as optical clarity, glass transition temperatures and for membrane purposes, improved mass transport properties.

Considerable research has been done in attempts to prepare blend polymer membranes. However, only a few membrane systems have been discovered. Y. Maeda et al., *Polymer*, 26, 2055 (1985) report the preparation of blend membranes of poly(dimethylphenylene oxide)-polystyrene for gas permeation. They found this system to exhibit permeation rates unlike the permeation rates of either of the blend's polymer components.

Poly(vinylidene fluoride), $PVF_2$, is a hydrophobic polymer that is used as a membrane in microfiltration and ultrafiltration. Bernstein et al., *Macromolecules*, 10, 681 (1977) report that a blend of $PVF_2$ with poly(vinyl acetate) increases hydrophilicity of such hydrophobic membrane, which is needed in order to ultrafiltrate aqueous solutions. They found the macromolecules of the two polymers to be miscible at the molecular level. However, very few scientific tools are provided to predict a blend polymer membrane suitable for use in electrochemical cells.

In our prior U.S. patent application Ser. No. 08/725,747, published as WO 97/24777 on Jul. 10, 1997, the disclosure of which is incorporated herein by reference, we disclosed and claimed, inter alia, a polymer electrolyte membrane containing an ion-exchange polymer membrane, the ion-exchange membrane comprising a blend of a homogeneously sulfonated poly(phenylene oxide) and poly (vinylidene fluoride), wherein the homogeneously sulfonated poly(phenylene oxide) had a number average molecular weight between about 15,000 and about 10,000,000 and an ion charge density between about 1 and about 3.9 meq/g, wherein the poly(vinylidene fluoride) has a number average molecular weight between about 10,000 and about 10,000,000, and wherein the weight ratio of homogeneously sulfonated poly(phenylene oxide) to poly(vinylidene fluoride) in the blend was between about 1 to 1 and about 20 to 1.

It is, therefore, an objective of the invention to produce a low cost, easy to prepare ion-exchange polymer membrane with favorable chemical and mechanical properties for PEM fuel cell and other electrochemical applications.

Another object of the invention is to provide an improved solid polymer electrolyte fuel cell having a high current density, e.g., between 1 A/cm$^2$ and 2 A/cm$^2$ at 0.5 V, using a very low loading electrode equivalent to a platinum loading of between 0.1 and 0.2 mg/cm$^2$ on a platinum/carbon/PTFE electrode at 30 psi reactant gases.

Another object of the invention is to provide an improved electrical double-layer capacitor having a specific capacitance, e.g. between 20 farad/cm$^3$ and 60 farad/cm$^3$.

Another object of the invention is to provide a rechargeable zinc-halide cell having a high current and voltage efficiency, e.g., between 80% and 100% when tested for 800 cycles (3 h/3 h), and a high energy density, e.g., between 70 mWh/cm$^3$ and 100 mWh/cm$^3$.

Another object is to provide novel homogeneous blends of sulfonated poly(phenylene oxide) with poly(vinylidene fluoride).

SUMMARY OF THE INVENTION

The objectives and criteria for the solid electrolyte membrane mentioned above can be achieved by the practice of this invention. In one aspect, the invention concerns an improved ion-exchange polymer membrane, the improvement in which the membrane comprises homogeneously sulfonated poly(phenylene oxide) blended with poly(vinylidene fluoride), the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly(vinylidene fluoride) in the blend being greater than about 1 to 49 and less than about 19 to 31.

In another aspect, this invention concerns a solid polymer electrolyte membrane fuel cell containing an ion-exchange polymer membrane as electrolyte sandwiched between an electrochemically reactive porous anode and cathode, the improvement in which the ion-exchange polymer membrane comprises a blend of a homogeneously sulfonated poly(phenylene oxide) and poly(vinylidene fluoride), the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated polyphenylene oxide) to poly(vinylidene fluoride) in the blend being greater than about 1 to 49 and less than about 19 to 31, the fuel cell capable of having a current density between about 1 A/cm$^2$ and about 2 A/cm$^2$ at 0.5 V, while using a minimum catalyst loading equivalent to between 0.1 mg/cm$^2$ and 0.2 mg/cm$^2$ of platinum on a platinum/carbon polytetrafluoroethylene electrode at 30 psi reactant gases, and a cell temperature between 45° C. and 85° C.

Preferably, in the improved ion-exhange polymer membrane and/or the solid polymer electrolyte membrane fuel cell, the alkali metal of the homogeneously sulfonated poly(phenylene oxide) of the polymer electrolyte membrane is Li$^+$, Na$^+$ or K$^+$; the number average molecular weight of the homogeneously sulfonated poly(phenylene oxide) is between about 30,000 and about 10,000,000; the ion exchange capacity of the homogeneously sulfonated poly(phenylene oxide) polymer is between about 2 and about 3.5 meq/g; and/or the weight ratio homogeneously sulfonated poly (phenylene oxide) to poly (vinylidiene fluoride) in the blend is greater than about $\frac{1}{5}$ and less than about $\frac{7}{13}$.

In another aspect, this invention concerns an improved electrolyte double-layer capacitor containing an ion-exchange polymer membrane as electrolyte disposed between and in contact with a pair of polarizable electrodes, the improvement wherein the ion-exchange polymer membrane comprises a blend of a homogeneously sulfonated poly(phenylene oxide) and poly(vinylidene fluoride), the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly (vinylidene fluoride) in the blend being greater than about 1 to 49 and less than about 20 to 1, the capacitor capable of having a dielectric constant between about 10 farad/cm$^3$ and about 40 farad/cm$^3$ while at a cell temperature between 45° C. and 85° C.

In another aspect, this invention concerns an improved rechargeable zinc-halide cell containing an ion-exchange polymer membrane as a zinc cation ion exchange diaphragm positioned between an anode compartment and a cathode compartment, adapted to substantially entirely prevent passage of bromide ions from the cathode compartment into the anode compartment, the diaphragm substantially entirely separating the anode compartment from the cathode compartment, the improvement in which the ion-exchange polymer membrane comprises a blend of a homogeneously sulfonated poly(phenylene oxide) and poly(vinylidene fluoride), the homogeneously sulfonated poly(phenylene oxide) having a number average molecular weight between about 15,000 and about 10,000,000 and an ion charge density between about 1 and about 3.9 meq/g, the poly (vinylidene fluoride) having a number average molecular weight between about 10,000 and about 10,000,000, the weight ratio of homogeneously sulfonated poly(phenylene oxide) to poly(vinylidene fluoride) in the blend being greater than about 1 to 49 and less than about 20 to 1, the zinc-halide cell capable of having an energy density between about 50 mWh/cm$^3$ and about 100 Wh/cm$^3$, and a current and voltage efficiency between about 70% and about 100%, while using a minimum catalyst loading equivalent to between 0.1 mg/cm$^2$ and 0.2 mg/cm$^2$ of platinum on a platinum/carbon polytetrafluoroethylene electrode at 30 psi reactant gases, and a cell temperature between 45° C. and 85° C.

Preferably, in the improved electrolyte double-layer capacitor and/or the improved rechargeable zinc-halide cell, the number average molecule weight of the homogeneously sulfonated poly(phenylene oxide) is between about 30,000 and about 10,000,000; the ion exchange capacity of the homogeneously sulfonated poly(phenylene oxide) polymer is between about 2 and about 3.5 meq/g; and/or the weight ratio of homogeneoulsy sulfonated poly (phenylene oxide) to poly(vinylidene fluoride) in the blend is greater than about 1/9 and less than about 6 to 1.

DETAILED DESCRIPTION OF THE INVENTION

The sulfonated poly(phenylene oxide) polymer used in this invention has a chemical structure characterized by the following recurring unit:

where $R_1$ and $R_2$ are each selected from the group of substituents consisting of H, $SO_3H$ and $SO_3M$, wherein n is an integer greater than 40, and M is selected from the group consisting of an alkaline metal, an alkaline earth metal, and a transition metal. When the substituents are more frequently $SO_3H$ and $SO_3M$ than H, the polymer has a higher charge density and is more soluble in water. Conversely, when H is more frequently the substituent, the polymer has lower charge densities.

Suitable alkaline metals include sodium, lithium and potassium; suitable alkaline earth metals include calcium, barium, magnesium and aluminum; and suitable transition metals include chromium and iron. Preferably, $R_1$ and $R_2$ each include the lithium salt of sulfonic acid and sulfonic acid groups in the recurring unit. Sulfonated poly(phenylene oxide) polymers suitable for use in applicants' invention are described in U.S. Pat. Nos. 5,348,569 and 5,364,454, the disclosures of which are herein incorporated by reference.

It is critical to prepare the sulfonated poly(phenylene oxides) by a homogeneous process. One homogeneous process involves dissolving precursor aromatic polymers in an inert solvent; adding and mixing a sulfonation agent at a temperature sufficiently low to avoid any significant sulfonation reaction, and raising the temperature of the resulting mixture to cause sulfonation of the precursor aromatic polymer.

The homogeneously sulfonated poly(phenylene oxide) polymer in salt form is very soluble in common solvents, such as alcohols, ketones, aprotic solvents and mixtures of these solvents with water. The degree of sulfonation is measured by the ionic charge density, ICD, and expressed in meq/g (which is the milliequivalent of $SO_3$-/gram of polymer).

Applicants have discovered that when certain sulfonated poly(phenylene oxide) polymers as described herein having (1) molecular weights greater than about 15,000, preferably greater than about 30,000, more preferably greater than about 50,000, and less than about 10,000,000, preferably less than about 1,000,000 and (2) an ion charge density greater than about 1.0 meq/g, preferably greater than about 1.7 meq/g, more preferably greater than about 2.0 meq/g, and less than about 3.9 meq/g, preferably less than about 3.5 meq/g, are blended with certain poly(vinylidene fluoride) polymers, electrolyte membranes having improved characteristics may be formed. Most preferred is a sulfonated poly(phenylene oxide) having an ionic charge density of about 3.0 meq/g. Specifically, the resultant membranes have enhanced selectivity, permeability, and mechanical strength, and are easily crosslinked by γ-ray radiation, ultra violet (UV) radiation and thermal treatment. Moreover, applicants' sulfonated poly(phenylene oxide) polymers can be copolymerized with other polymers.

Applicants also have discovered that a sulfonated poly (polyphenylene oxide) as defined herein forms a homogeneous blend with poly(vinylidene fluoride) which may advantageously be used as a polymer membrane electrolyte. Sulfonated PPO is an amorphous cation exchange polymer, while $PVF_2$ is a hydrophobic thermoplastic polymer. $PVF_2$ is a semi-crystalline polymer that displays up to 50% semi-crystallinity. It is soluble in solvents like dimethylsulfoxide (DMSO), N-methyl pyrrolidone (NMP), dimethylacetamide, and dimethylformamide (DMF). Its crystal melting point is between 155° C. and 163° C. and its glass transition temperature is between −30° C. and −10° C. Therefore, $PVF_2$ is a non-crosslinked, rubbery polymer where the hard crystalline domains serve as crosslinking junctures in the blend.

Performance of polymer electrolyte membranes can be measured in terms of conductivity, current density and/or durability over time. In our prior U.S. patent application Ser. No. 08/725,747, referenced hereinabove, we disclosed that the performance of polymer electrolyte membranes containing an ion-exchange membrane in which the ion-exchange polymer membrane comprised a blend of a homogeneously sulfonated PPO and $PVF_2$, decreased to unacceptable levels as the weight % of $PVF_2$ in the blend increased from 50% to 60%. Conductivity, current density and durability of the polymer electrolyte membrane decreased to unacceptable levels as the weight ratio of homogeneously sulfonated PPO to $PVF_2$ in the blend fell below about 1 to 1. Applicants now have unexpected discovered that when the amount of $PVF_2$ in the blend exceeds about 62% by weight, performance of the polymer electrolyte membrane containing the ion-exchange polymer membrane increases to acceptable levels.

Applicants have found that blends of $PVF_2$ with sulfonated PPO polymer, as defined herein, exhibit distinct melting points of the crystalline domain of $PVF_2$ between 155° C. and 158° C., and have a much higher modulus and tensile strength than sulfonated poly(phenylene oxide) has. Moreover, applicants have discovered that some compositions of such blends have unexpectedly higher ionic conductivity than sulfonated PPO has. This is surprising since one would have expected that blending poly(vinylidene fluoride) with sulfonated PPO would decrease ionic conductivity. Higher ionic conductivity using a blend membrane according to applicants' invention means the fuel cells have better performance than a fuel cell using a sulfonated PPO membrane.

Figure 1A:
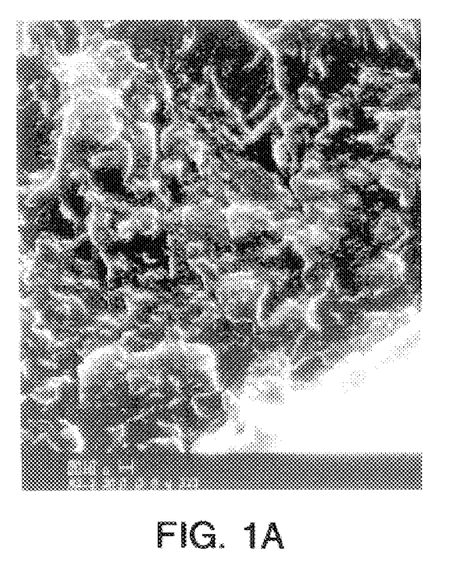
FIGS. 1A and 1B are scanning electron microscope (SEM) photographs magnified 2000× of a cross-section of a blend membrane used in both the electrolyte double layer capacitor and the rechargeable zinc-halide cell of the present invention and a SEM photograph magnified 1000× of a surface of blend membrane useful in the present invention. The blend membrane comprises 80 wt % sulfonated PPO and 20 wt % $PVF_2$ (Mw=350,000).
Figure 1B:
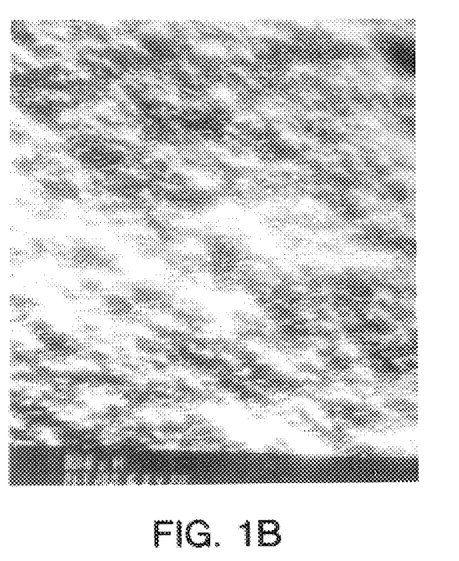
Figure 2A:
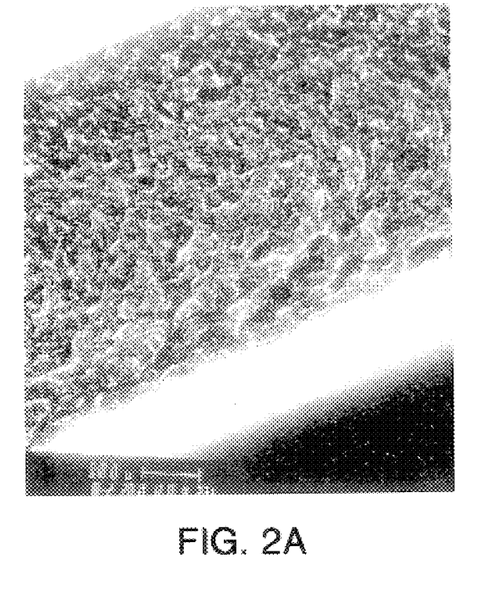
FIGS. 2A and 2B are scanning electron microscope (SEM) photographs magnified 200× of a cross-section of a blend membrane according to the present invention and a SEM photograph magnified 200× of a surface of the blend membrane according to the present invention. The blend membrane comprises 70 wt % sulfonated PPO and 30 wt % $PVF_2$ (Mw=350,000).
Figure 2B:
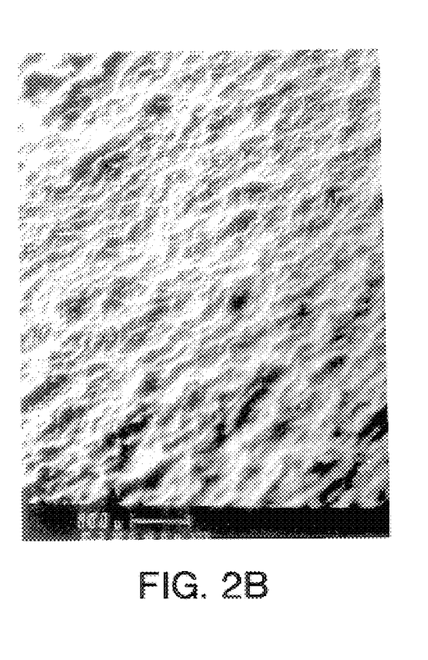
Figure 3A:
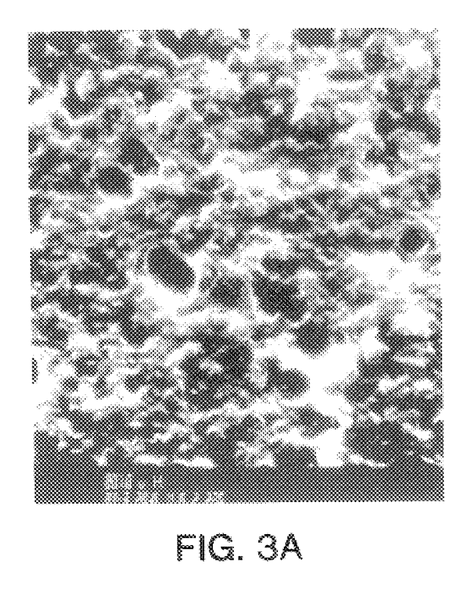
FIGS. 3A and 3B are scanning electron microscope (SEM) photographs magnified 3000× of a cross-section of a blend membrane according to the present invention and a SEM photograph magnified 1000× of a surface of the blend membrane according to the present invention. The blend membrane comprises 50 wt % sulfonated PPO and 50 wt % $PVF_2$ (Mw=350,000).
Figure 3B:
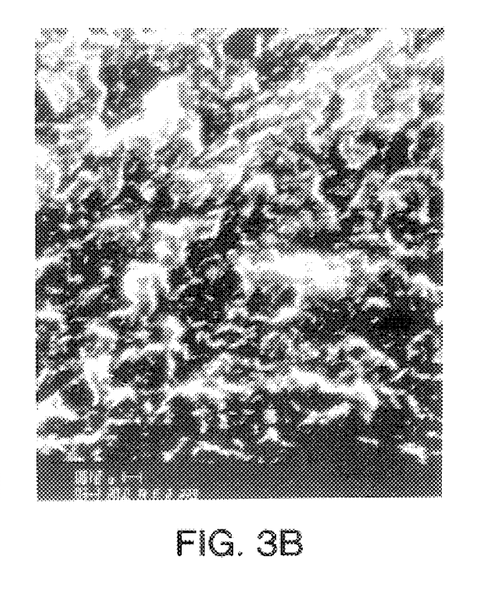
Figure 4:
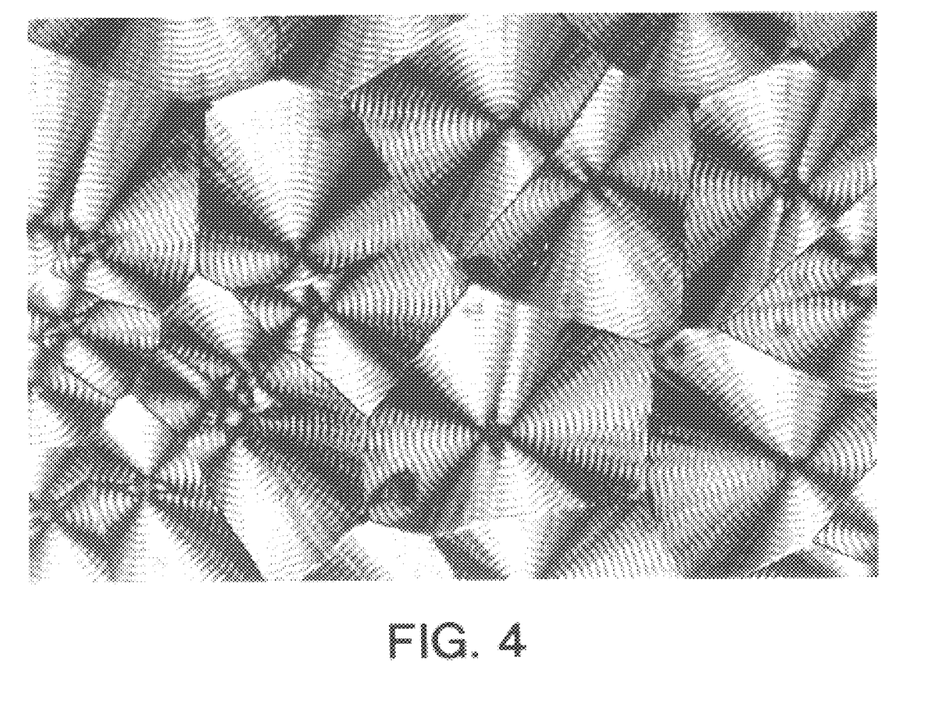
FIG. 4 is a polarized light microscope photograph magnified 500× of a surface of a $PVF_2$ polymer membrane showing its high crystalline structure.

Applicants also have found that sulfonated PPO and $PVF_2$ blend membranes conduct ions under an electrical driving force, when comprised of more than 62% by weight of $PVF_2$. This is suprising because blend membranes comprised of more than 50% by weight of $PVF_2$ would not be expected to conduct transport ions or water. $PVF_2$ is a highly crystalline hydrophobic polymer (FIG. 4) and crystals are impermeable to gases. Thus, one would have expected blend membranes comprised of more than 50% by weight of $PVF_2$ to be impermeable, even to gases, because their structure would be dominated by impermeable crystals of the $PVF_2$ phase and interfaces of the crystals.

Figure 5:
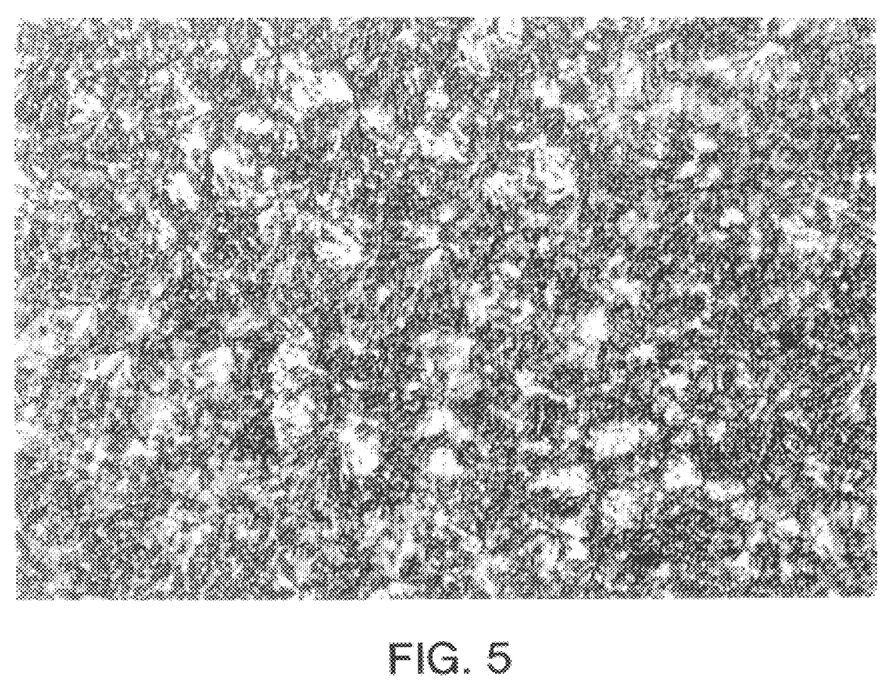
FIG. 5 is a polarized light microscope photograph magnified 500× of a surface of a blend membrane according to the present invention. The blend membrane comprises 60 wt % sulfonated PPO and 40 wt % $PVF_2$.
Figure 6:
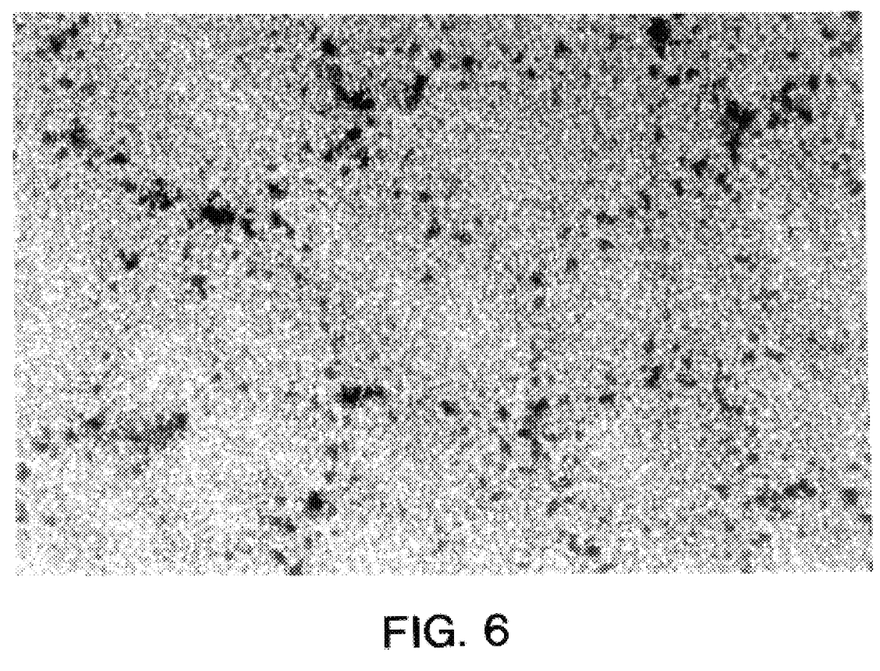
FIG. 6 is a polarized light microscope photograph magnified 500× of a surface of a blend membrane according to the present invention. The blend membrane comprises 50 wt % sulfonated PPO and 50 wt % $PVF_2$ (Mw=60,000).
Figure 7:
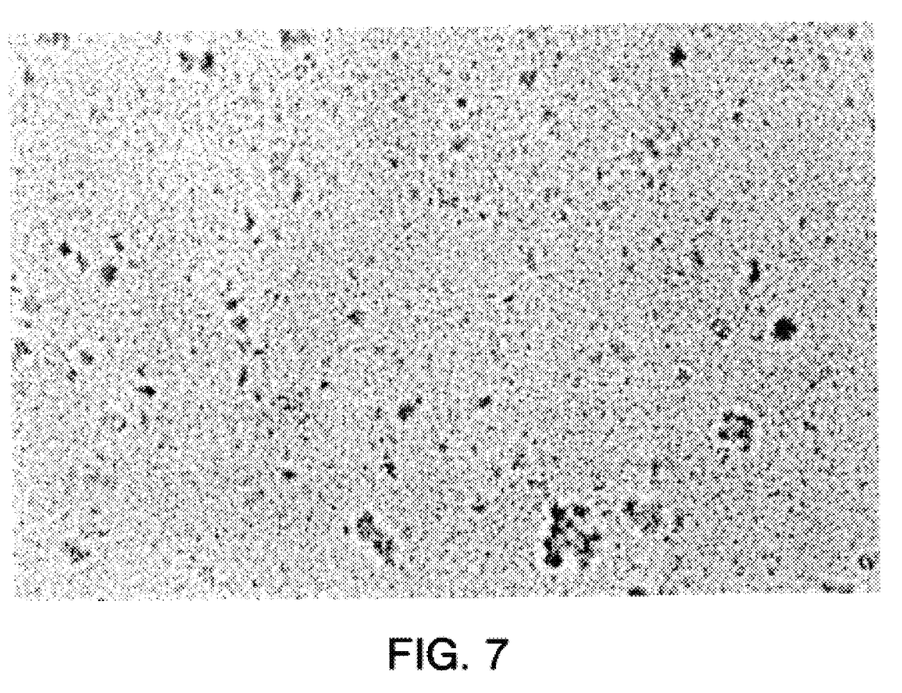
FIG. 7 is a polarized light microscope photograph magnified 500× of a surface of a blend membrane according to the present invention. The blend membrane comprises 20 wt % sulfonated PPO and 80 wt % $PVF_2$ (Mw=60,000).

At weight ratios between about 1 to 1 and about 20 to 1 of sulfonated PPO to $PVF_2$, as seen in FIGS. 5 and 6, $PVF_2$ loses its crystallinity, and the blend becomes hydrophillic. In contrast, when the weight ratio of sulfonated PPO to $PVF_2$ is less than about 19 to 31 and greater than about 1 to 49, the blend is high crystalline, as seen in FIG. 7, and the resulting blend membrane is hydrophobic. Applicants have found that these crystalline blend membranes provide good barriers to many aqueous solutes, because of their low affinity to water and suprisingly conduct ions under an electrical driving force. The crystalline phase in these blends has a continuous subphase that dominates in the membrane structure, as seen in FIG. 6.

Applicants further have found that there is reduced swelling in blend membranes according to applicants' invention. It is believed that the $PVF_2$ in the blend reduces the absorption of water in the blend membrane when submerged in water. The percent water absorbed (W) is less than about 25%.

Applicants' blends are made by dissolving sulfonated poly(phenylene oxide) in a solution with solvent, dissolving poly(vinylidene fluoride) in a solution with solvent and mixing the solutions together. The blend membrane then is obtained by casting this mixed solution onto a clean glass surface with a Doctor knife and drying the solution for a time period sufficient to evaporate essentially all of the solvent, leaving a dry, translucent white film having a thickness greater than about 10 micrometers ($\mu$m), preferably greater than about 40 $\mu$m, less than about 200 $\mu$m and preferably less than about 150 $\mu$m.

For applications such as ion-exchange polymer membranes and solid electrolyte polymer electrolyte membrane fuel cells, the weight ratio of sulfonated poly(phenylene oxide) to the $PVF_2$ in the blend according to this invention is greater than about 1 to 49, preferably greater than about 1 to 20, and more preferably greater than about 1 to 9. Also, the weight ratio of sulfonated poly(phenylene oxide) to the $PVF_2$ in the blend is less than about 19 to 31, preferably less than about 7/13, more preferably less than about 1 to 3, and even more preferably less than about 1 to 4. The sulfonated PPO preferably comprises from 38% to about 2% by weight of the blend and $PVF_2$ comprises from about 98% to 62% of the blend. Most preferred are blends where the sulfonated PPO comprises between about 15 wt % and about 20 wt % of the blend, the balance being the $PVF_2$. If desired, the mechanical strength of blend membranes of this invention can be further increased by $\gamma$-ray radiation, UV radiation and/or by thermal treatment.

For applications such as electrolyte double-layer capacitors and rechargeable zinc-halide cells, the weight ratio of sulfonated poly(phenylene oxide) to the $PVF_2$ in the blend according to this invention is greater than about 1 to 49, preferably greater than about 1 to 20, and more preferably greater than about 1 to 9. Also, the weight ratio of sulfonated poly(phenylene oxide) to the $PVF_2$ in the blend is less than about 20 to 1, preferably less than about 9 to 1, and even more preferably less than about 6 to 1. The sulfonated PPO preferably comprises from about 2% to about 95% by weight of the blend and $PVF_2$ comprises from about 98% to about 5% of the blend. Most preferred are blends where the sulfonated PPO comprises between 15 wt % and about 85 wt % of the blend, the balance being the $PVF_2$. If desired, the mechanical strength of blend membranes of this invention can be further increased by $\gamma$-ray radiation, UV radiation and/or by thermal treatment.

Unlike conventional membranes, like Nafion®, which must be pressed onto electrodes at elevated temperatures of 120° C. to 150° C. and pressures of 200 psi to 1,000 psi, the blend membranes of this invention bond easily to electrodes at room temperature without requiring the application of pressure. A good interface is formed between electrodes and the sulfonated PPO membrane or blend membranes of this invention in the membrane electrode assembly. Electrodes are treated in the usual way with a solution of proton exchange polymer that can be selected from Nafion® solution dissolved in alcohol and the sulfonated PPO, or other soluble high charge density cation exchange polymers. The performance of the PEM fuel cells made by this invention were compared with the performance of perfluorinated Nafion® membranes in the same experimental set up and conditions and were found to be equal or better. The higher densities obtained with applicants' fuel cell were measured under one set of conditions. Of course, it is obvious to a skilled person that even higher current densities can be obtained with applicants' fuel cell under different conditions. For example, higher current densities can be obtained by using thinner membranes, higher reactant gas pressures and/or higher temperatures of operation.

The homogeneous blend membrane of sulfonated poly (phenylene oxide) with thermoplastic polymer $PVF_2$ of the present invention has the following advantages: (1) A large series of membranes with different weight ratios of sulfonated polyphenylene oxide) to $PVF_2$ can easily be produced; (2) Different copolymers of $PVF_2$ can be introduced into blends with sulfonated poly (phenylene oxide); (3) Some sulfonated PPO/$PVF_2$ blend membranes have higher conductivity than pure sulfonated poly(phenylene oxide)

membranes; (4) Blend membranes have higher flexibility and mechanical strength than pure sulfonated PPO membranes; (5) Blend membranes have lower swelling ratios in water than pure sulfonated PPO, (6) Blend Membranes have enhanced ion conductivity because of membrane hydrophilicity, (7) Blend Membranes have decreased electric resistance, because of ion immobilization (due to sulfonated PPO) on the membrane matrix ($PVF_2$), and (8) Blend Membranes have a resistance that can be adjusted easily by changing the ratio of the two blend components and membrane thickness. Therefore, these membranes can be used as: (1) polymer electrolyte membranes for hydrogen/oxygen electrochemical fuel cells; (2) electrode separators for secondary batteries; (3) ion-exchange membranes for electrodialysis, in which membranes are employed to separate components of an ionic solution under the driving force of an electrical current; (4) membranes for gas separation and pervaporation due to the enhanced selectivity and permeability of homogeneously sulfonated poly (phenylene oxide); (5) electrode separators for capacitors; and (6) ion-exchange membranes for Zinc-halide cells.

The following examples illustrate applicant's invention, but should not be construed as limiting the invention:

EXAMPLE 1

A light yellow sulfonated PPO polymer in the $Li^+$ form ($M_w$=50,000) was immersed in 1N HCl solution for several hours at room temperature. This step exchanges $Li^+$ with $H^+$ in the $SO_3$-group. The polymer was then washed carefully in D.I. water to rinse the excess acid. The wet sulfonated PPO in the $H^+$ form was put in a vacuum oven for 24 h at 40° C. The sulfonated PPO was then dissolved in dimethylformamide (DMF) to form a 20 wt % solution. A 20 wt % solution of poly(vinylidene fluoride), $PVF_2$ ($M_w$=60,000), in DMF was prepared separately. Then, 2.55 g of sulfonated PPO-DMF solution and 0.45 g of $PVF_2$-DMF solution were blended by mixing the two solutions at room temperature for 1 h. This blend has an 85:15 weight ratio of sulfonated-PPO:$PVF_2$. This blend solution was poured onto a clean glass plate surface and cast by a Doctor knife. This was then placed in a chamber under dry air flow for 48 h to evaporate most of the DMF. The final membrane was a dry, translucent, white with a 50 μm thickness. The ICD of this membrane was 2.9 meq/g. This membrane is suitable for use in electrolyte double-layer capacitors, and rechargeable zinc-halide cells.

EXAMPLE 2

20 wt % sulfonated-PPO $Li^+$ form polymer ($M_w$=50,000) was dissolved in DMF and 20 wt % of $PVF_2$ ($M_w$=60,000) was dissolved in DMF, separately. Then, the two solutions were mixed in a weight ratio of sulfonated PPO to $PVF_2$ of 80:20. This blended solution was stirred at room temperature for 1 h. The blend solution was poured onto a clean surface glass plate, and cast by a Doctor knife. The cast solution then was placed in a chamber under dry air for 48 h. After the membrane had dried, it then was placed into 0.5 N HCl solution for exchange of $Li^+$ to be converted to proton form. The cast membrane was 55 μm thick and in the wet state, has a conductivity of 0.22 S/cm at 45° C. This membrane is suitable for use in electrolyte double-layer capacitors, and rechargeable zinc-halide cells.

EXAMPLE 3

25 wt % of sulfonated PPO $Li^+$ form polymer ($M_w$=50,000) was dissolved in isopropanol. No second polymer was added. The sulfonated PPO membrane was cast by a Doctor knife on a clean surface glass plate. The membrane was dried in dry air atmosphere for 48 h and then put in an oven at 70° C. for 24 h. The sulfonated membrane was transparent with a light yellow-brown color. The thickness of the membrane was 120 μm. The membrane then was placed in 0.1 N HCl solution for 1 h. The ICD of this membrane was measured as 3.0 meq/g. The swelling ratio of this membrane in water was 25% at 30° C. and 31% at 80° C. Conductivity of the membrane at 45° C. was 0.016 S/cm.

EXAMPLE 4

The same procedure was employed as in Example 3, except that the membrane was crosslinked by γ-ray radiation.

EXAMPLE 5

The same procedure was employed as in Example 3, except that the solvent used was DMF.

EXAMPLE 6

The same procedure was employed as in Example 3, except that the membrane was subjected to crosslinking by heat treatment at 80° C. for 5 minutes.

EXAMPLE 7

The same procedure was employed as in Example 3, except that the membrane was exposed to UV radiation for 30 minutes.

EXAMPLE 8

The same procedure was employed as in Example 1, except that the weight ratio of sulfonated PPO to $PVF_2$ was 75:25. This membrane is suitable for use in electrolyte double-layer capacitors, and rechargeable zinc-halide cells.

EXAMPLE 9

The same procedures were used as in Example 1, except that the weight ratio of sulfonated PPO to $PVF_2$ was 70:30. This membrane is suitable for use in electrolyte double-layer capacitors, and rechargeable zinc-halide cells.

EXAMPLE 10

The same procedures were used as in Example 1, except that the weight ratio of sulfonated PPO to $PVF_2$ was 65:35. This membrane is suitable for use in electrolyte double-layer capacitors, and rechargeable zinc-halide cells.

EXAMPLE 11

The same procedures were used as in Example 1, except that the weight ratio of sulfonated PPO to $PVF_2$ was 50:50. This membrane is suitable for use in electrolyte double-layer capacitors, and rechargeable zinc-halide cells.

EXAMPLE 12

A sulfonated PPO polymer in $Li^+$ form (Mw=50,000) was dissolved in dimethylformamide (DMF) to form a 20 wt % solution. A 20 wt % solution of high molecular weight $PVF_2$ (Mw=350,000), in DMF was prepared separately. Then 8 g of sulfonated PPO-DMF solution and 2 g of $PVF_2$-DMF solution were blended by mixing the two solutions at room temperature for 0.5 h. This blend had an 80:20 weight ratio of sulfonated PPO:high molecular weight $PVF_2$. The blend solution was poured onto a clean surface glass plate, and cast by a Doctor knife. Then the blend membrane was placed in a chamber under dry air for 48 h. The blend membrane was placed into a 0.5 N HCl solution for exchange of Li⁺ and conversion to proton form. This membrane is suitable for use in electrolyte double-layer capacitors, and rechargeable zinc-halide cells.

EXAMPLE 13

The same procedure was used as in Example 12, except the weight ratio of sulfonated PPO to High molecular weight $PVF_2$ was 70:30. This membrane is suitable for use in electrolyte double-layer capacitors, and rechargeable zinc-halide cells.

EXAMPLE 14

The same procedure was used as in Example 12, except the weight ratio of sulfonated PPO to $PVF_2$ (Mw=350,000) was 50:50. This membrane is suitable for use in electrolyte double-layer capacitors, and rechargeable zinc-halide cells.

EXAMPLE 15

The same procedure was used as in Example 12, except the weight ratio of sulfonated PPO to $PVF_2$ (Mw=350,000) was 40:60. The fuel cell prepared using this membrane tested for 50 hours at 80° C. without decreasing performance. The conductivity of this membrane is 0.027S/cm at 80° C. and its water uptake is 2.9 n $H_2O$,/charge. The fuel cell has an open voltage of 0.85V and a current density of 0.4 A/cm² at 80° C. This membrane is suitable for use in electrolyte double-layer capacitors, and rechargeable zinc-halide cells.

EXAMPLE 16

Sulfonated-PPO in the Li⁺ form, and with a high charge density (ICD=3.7 meq/g), was dissolved in DMF to form a 20 wt % solution. A 20 wt % solution of $PVF_2$ ($M_w$=60,000) in DMF was prepared separately. The two solutions then were blended in a weight ratio of sulfonated PPO to $PVF_2$ of 37:63. This blended solution was stirred at room temperature for 1 h. The blend solution was poured onto a clean surface glass plate and cast by a Doctor knife. This cast solution then was placed in a chamber under dry air for 48 h to evaporate most of the DMF. After drying, the membrane was placed into 0.5 N HCl solution for exchange of Li⁺ to be converted to proton form. The cast membrane was 70 μm thick and in the wet state. This polymer electrolyte blend membrane then was placed between two electrodes at ambient temperature and pressure. The resulting PEM cell displayed a current density of 1.0 A/cm² at 0.5V. This membrane is suitable for use in PEM fuel cells, electrolyte double-layer capacitors, and rechargeable zinc-halide cells.

EXAMPLE 17

A double-layer capacitor was fabricated from activated carbon paper electrodes and a sulfonated PPO and $PVF_2$ blend membrane, as the separator. A 30 wt % solution of $H_2SO_4$ was employed as the electrolyte. Solutions of sulfonated PPO and $PVF_2$ in DMF were prepared separately, blended in a weight ratio of sulfonated PPO to $PVF_2$ of 10:90, and mixed at room temperature for 1 h. This blend solution then was poured onto a clean glass plate surface and cast by a Doctor knife. This cast solution was then submerged in D.I. water to form a porous membrane. Two carbonized phenolic resin carbon paper electrodes and the porous membrane were immersed into a 30 wt % $H_2SO_4$ solution overnight. The membrane then was sandwiched between the two carbon paper electrodes, as a separator. The membrane had a thickness of about 70 μm, and the apparent electrode area was 1.0 cm². A capacitance of 1.8 F corresponding to 20 farad/cm³ was observed, when discharged with a 100-ohm resistor.

EXAMPLE 18

The same procedure was employed as in Example 17, except that a weight ratio of sulfonated PPO to $PVF_2$ of 2:98 was used to make the membrane/separator for the double-layer capacitor. A capacitance of 1.2 F corresponding to 14 farad/cm³ was observed.

EXAMPLE 19

A non-flow zinc bromine cell is constructed as follows: A paste prepared from 20% polyacrylamide and 80% carbonized phenolic resin carbon is placed into a cathode compartment. 5 M $ZnBr_2$/KCl polyacrylamide hydro gel is placed into an anode compartment. A thin sulfonated PPO/$PVF_2$ blend membrane is sandwiched between the cathode and anode compartments, as the separator.

The blend membrane/separator was prepared using the following process: sulfonated PPO was dissolved in DMF to form a 20 wt % solution. A 20 wt % solution of $PVF_2$ was prepared separately. These solutions were blended in a weight ratio of sulfonated PPO to $PVF_2$ of 40:60, and mixed at room temperature for 1 h. This blend solution was poured onto a clean glass plate surface and cast by a Doctor knife. The cast solution then was placed in a chamber under dry air flow for 48 h to evaporate most of the DMF.

The cell had a cross-sectional area of 30 cm². The capacity of the cell was 5.8 A h with an energy density of 83 mWh/cm³. This cell was tested for 800 cycles (3 h/3 h) with a current and voltage efficiency of about 95%.

EXAMPLE 20

To make a membrane/separator for a non-flow zinc bromine cell, the same procedure was employed as in Example 3, except that a weight ratio of sulfonated PPO to $PVF_2$ was 30:70. The current and voltage efficiency of the non-flow zinc bromine cell were about 93%.

What is claimed is:

1. An ion-exchange polymer membrane comprising a blend of a homogeneously sulfonated poly(phenylene oxide) and poly(vinylidene fluoride), the homogeneously sulfonated poly(phenylene oxide) having a chemical structure characterized by the following recurring unit:

wherein $R_1$ and $R_2$ are each selected from the group consisting of H, $SO_3H$ and $SO_3M$; and M is a metal selected from the group consisting of an alkali metal, an alkaline earth metal and a transition metal, and n is an integer greater than 40, the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly(vinylidene fluoride) in the blend being between greater than about 1/49 and less than about 19/31.

2. The polymer electrolyte membrane of claim 1, wherein in said homogeneously sulfonated poly(phenylene oxide), said alkali metal is $Li^+$, $Na^+$ or $K^+$.

3. The polymer electrolyte membrane of claim 1, wherein said homogeneously sulfonated poly(phenylene oxide) has a number average molecular weight between about 30,000 and about 10,000,000.

4. The polymer electrolyte membrane of claim 1, wherein said homogeneously sulfonated poly(phenylene oxide) polymer has an ion exchange capacity between about 2 and about 3.5 meq/g.

5. The polymer electrolyte membrane of claim 1, wherein said weight ratio is greater than about 1/5 and less than about 7/13.

6. In a solid polymer electrolyte membrane fuel cell containing an ion-exchange polymer membrane as electrolyte sandwiched between an electrochemically reactive porous anode and cathode, the improvement in which the ion-exchange polymer membrane comprises a blend of a homogeneously sulfonated poly(phenylene oxide) and poly(vinylidene fluoride), the homogeneously sulfonated poly(phenylene oxide) having a chemical structure characterized by the following recurring unit:

wherein $R_1$ and $R_2$ are each selected from the group consisting of H, $SO_3H$ and $SO_3M$; and M is a metal selected from the group consisting of an alkali metal, an alkaline earth metal and a transition metal, and n is an integer greater than 40, the homogeneously sulfonated poly(phenylene oxide) having a number average molecular weight between about 15,000 and about 10,000,000 and an ion charge density between about 1 and about 3.9 meq/g, the poly(vinylidene fluoride) having a number average molecular weight between about 10,000 and about 10,000,000, the weight ratio of homogeneously sulfonated poly(phenylene oxide) to poly(vinylidene fluoride) in the blend being greater than about 1/49 and less than about 19/31, the fuel cell capable of having a current density between about 1 $A/cm^2$ and about 2 $A/cm^2$ at 0.5 V, while using a minimum catalyst loading equivalent to between 0.1 $mg/cm^2$ and 0.2 $mg/cm^2$ of platinum on a platinum/carbon polytetrafluoroethylene electrode at 30 psi reactant gases, and a cell a temperature between 45° C. and 85° C.

7. The polymer electrolyte fuel cell of claim 6, wherein said homogeneously sulfonated poly(phenylene oxide) has a number average molecular weight between about 30,000 and about 10,000,000.

8. The polymer electrolyte fuel cell of claim 6, wherein said homogeneously sulfonated poly(phenylene oxide) polymer has an ion exchange capacity between about 2 and about 3.5 meq/g.

9. The polymer electrolyte fuel cell of claim 6, wherein said weight ratio is greater than about 1/5 and less than about 7/13.

* * * * *